(12) United States Patent
Croft et al.

(10) Patent No.: US 8,282,878 B2
(45) Date of Patent: Oct. 9, 2012

(54) SINTERING AIDS

(75) Inventors: Alan P. Croft, Cedar Park, TX (US); David C. Lewis, Conroe, TX (US)

(73) Assignee: Huntsman Petrochemical LLC, The Woodlands, TX (US)

(*) Notice: Subject to any disclaimer, the term of this patent is extended or adjusted under 35 U.S.C. 154(b) by 0 days.

(21) Appl. No.: 13/014,793

(22) Filed: Jan. 27, 2011

(65) Prior Publication Data

US 2011/0124482 A1 May 26, 2011

Related U.S. Application Data

(62) Division of application No. 12/369,957, filed on Feb. 12, 2009, now abandoned.

(60) Provisional application No. 61/029,398, filed on Feb. 18, 2008.

(51) Int. Cl.
*C04B 33/32* (2006.01)
*C04B 35/645* (2006.01)
*C04B 35/565* (2006.01)

(52) U.S. Cl. ........ 264/603; 264/624; 264/625; 264/645; 264/661; 264/667; 264/669; 264/670; 264/682; 501/1; 501/5; 501/87; 501/88; 501/90; 501/92; 501/96.1

(58) Field of Classification Search ................. 501/1, 5, 501/87, 88, 90, 92, 96.1; 264/624, 661, 667, 264/669, 670, 603, 645, 682; 252/182.32, 252/182.33, 182.34, 182.11
See application file for complete search history.

(56) References Cited

U.S. PATENT DOCUMENTS

| | | | |
|---|---|---|---|
| 2,220,411 A * | 11/1940 | Kinzie et al. .................. 501/102 |
| 3,261,701 A * | 7/1966 | Grulke .......................... 501/96.3 |
| 3,475,186 A | 10/1969 | Dutkewych ................... 106/1.26 |
| 3,520,656 A * | 7/1970 | Yates et al. .................... 423/345 |
| 3,725,533 A * | 4/1973 | Economy et al. ............. 423/291 |
| 4,137,359 A | 1/1979 | Bak et al. ................... 428/296.4 |
| 4,154,911 A | 5/1979 | Bak et al. ....................... 524/161 |
| 4,361,435 A | 11/1982 | Meyers et al. ................. 504/152 |
| 4,622,069 A | 11/1986 | Akai et al. ..................... 106/1.11 |
| 4,889,646 A | 12/1989 | Vettel ............................. 508/316 |
| 5,034,018 A | 7/1991 | Gutierrez et al. ............... 44/331 |
| 5,188,886 A | 2/1993 | Dupon et al. .................. 428/209 |
| 5,268,233 A * | 12/1993 | Heller et al. ................... 428/523 |
| 5,288,431 A | 2/1994 | Huber et al. ................... 510/341 |
| 5,342,563 A * | 8/1994 | Quinn et al. ................... 264/681 |
| 5,512,191 A | 4/1996 | Krueger ......................... 508/250 |
| 5,585,428 A * | 12/1996 | Quinn et al. ................... 524/400 |
| 5,590,387 A | 12/1996 | Schmidt et al. .................. 419/36 |
| 5,614,484 A | 3/1997 | Panandiker .................... 510/102 |
| 5,665,679 A | 9/1997 | McInnes ........................ 504/164 |
| 5,780,404 A | 7/1998 | Bacon et al. ................... 510/101 |
| 5,804,543 A | 9/1998 | Wertz et al. .................... 510/303 |
| 5,985,803 A | 11/1999 | Rizvi et al. ..................... 508/194 |
| 6,387,339 B1 | 5/2002 | Kaneyoshi et al. ............ 423/263 |
| 6,511,946 B1 | 1/2003 | Theis et al. .................... 508/195 |
| 6,602,833 B1 | 8/2003 | Skold ............................. 508/423 |
| 2001/0008948 A1 | 7/2001 | Ringer et al. .................. 562/538 |
| 2002/0085888 A1 | 7/2002 | Velpari et al. .................. 408/1 R |
| 2003/0109588 A1* | 6/2003 | Schmidt et al. .................. 516/20 |
| 2003/0220424 A1* | 11/2003 | Schofalvi et al. .............. 524/195 |
| 2004/0014624 A1 | 1/2004 | Bolkan et al. .................. 510/296 |
| 2005/0031788 A1 | 2/2005 | McCaskie et al. ............. 427/305 |
| 2007/0298983 A1 | 12/2007 | Theunissen et al. ........... 508/264 |
| 2009/0206526 A1* | 8/2009 | Croft et al. ..................... 264/645 |
| 2010/0069223 A1* | 3/2010 | Prilutsky et al. ................ 501/88 |

* cited by examiner

*Primary Examiner* — Joseph D Anthony

(74) *Attorney, Agent, or Firm* — Monique M. Raub

(57) ABSTRACT

Embodiments of the present invention disclosed herein include a sintering aid composition that has a material useful for sintering, an amine, and optionally a carboxylic acid.

5 Claims, 1 Drawing Sheet

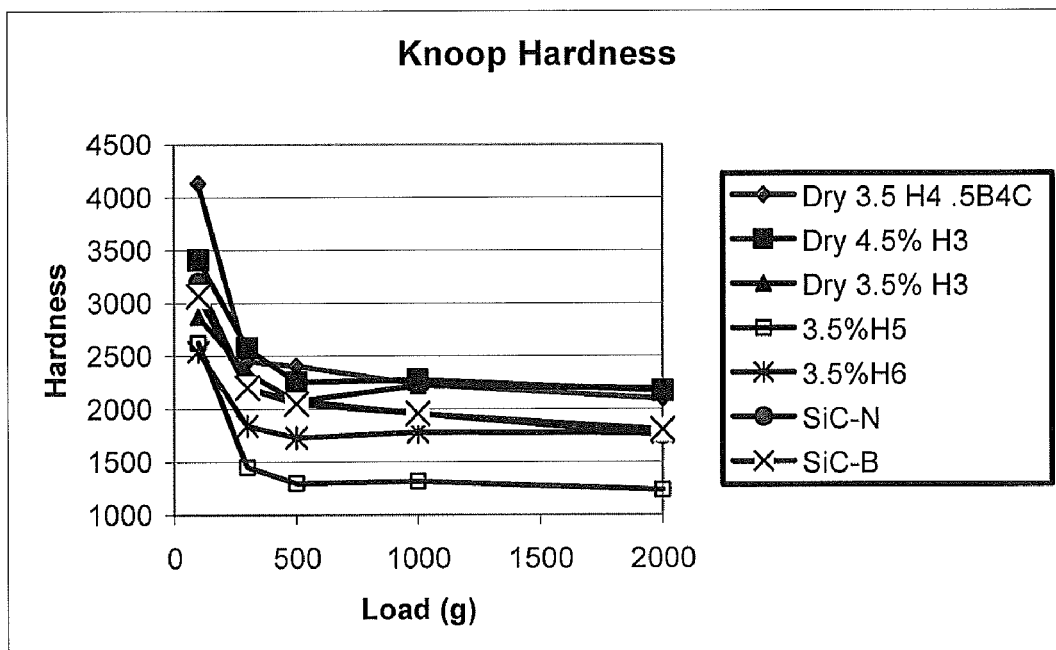

SINTERING AIDS

CROSS-REFERENCE TO RELATED APPLICATIONS

This application is a divisional of U.S. patent application Ser. No. 12/369,957, pending, which claims priority to U.S. Provisional Application Ser. No. 61/029,398, filed on Feb. 18, 2008. The noted applications are incorporated herein by reference.

STATEMENT REGARDING FEDERALLY SPONSORED RESEARCH OR DEVELOPMENT

Not applicable

BACKGROUND OF THE INVENTION

1. Field of the Invention

The present invention relates generally to ceramics manufacture and more particularly to sintering aid compositions used in preparing ceramic articles.

2. Background of the Invention

Sintering is the action of fusing of inorganic powders at high temperature to produce a ceramic article or part. Often sintering is also termed "firing." In ceramics, this firing or sintering is often done in a high temperature furnace or the like. An example of a ceramic material formed in this way is silicon carbide (SiC), which is composed of uniformly-sized SiC powder and which is fired to form the ceramic. At the microscopic level, a piece of SiC ceramic is composed of a three dimensional ordered array of uniformly-sized SiC spheres (<1 micron in diameter) which are fused at their edges. The strength of the SiC ceramic comes from the uniformity of its ordered array.

Inorganic powders, such as SiC, typically have very high melting points. Sintering aid compositions act to reduce the melting point of the SiC so that the material can fuse at a lower (and more achievable) temperature. A drawback of using sintering aid compositions is that sintering aid materials remain in the ceramic article after the firing process. Traditional sintering aid compositions have used fine powders containing boron and carbon. These materials disrupt the ordered array of SiC spheres weakening the strength of the ceramic piece. These disruptions of the ordered arrays are points of failure when the ceramic is stressed.

BRIEF SUMMARY OF SOME OF THE PREFERRED EMBODIMENTS

Embodiments of the present invention disclose a sintering aid composition that includes a material useful for sintering, an amine, and optionally a carboxylic acid.

Also disclosed are methods for sintering a ceramic article. The methods provide an inorganic powder and a sintering aid composition, wherein the sintering aid composition comprises at least one material useful for sintering, at least one amine; and optionally at least one carboxylic acid. The method contacts the inorganic powder and the sintering aid composition to form a green body and fires the green body.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other compositions and methods for carrying out the same purposes of the present invention. It should also be realized by those skilled in the art that such equivalent compositions and methods do not depart from the spirit and scope of the invention as set forth in the appended claims.

BRIEF DESCRIPTION OF THE DRAWINGS

FIG. 1 displays the Knoop hardness values for HX derived samples and commercial samples.

DETAILED DESCRIPTION OF THE PREFERRED EMBODIMENTS

Embodiments of the present invention disclose a sintering aid composition that includes at least one material useful for sintering, at least one amine, and optionally at least one carboxylic acid.

The sintering aid composition includes at least one material useful for sintering. Any compound that is suitable to lower the melting point of an inorganic powder may be suitable for this present invention. In one embodiment, the material useful for sintering may be a boron compound, such as boric acid. In another embodiment, the material useful for sintering may be selected from yttrium, magnesium, lanthanum, barium, copper, compounds thereof, and combinations thereof. Embodiments of the present invention may add a second material useful for sintering, which may be selected from the materials listed herein. The second material useful for sintering does not necessarily indicate that it must be a different from the material useful for sintering. One skilled in the art, with the benefit of this disclosure will recognize appropriate materials useful for sintering to be used in the present invention.

The sintering aid composition also includes at least one amine. The amine may include one amine species or combinations of amine species. In one embodiment of the present invention, the amine is an amine in a salt form. In another embodiment of the present invention, the amine is tetraethylenepentamine. In embodiments of the present invention, the amines are alkyl amines such as ethyleneamines and ethanolamines. One skilled in the art, with the benefit of this disclosure will recognize other suitable amines for use in the present invention.

The sintering aid composition may optionally include at least one carboxylic acid. In one embodiment, the carboxylic acid is neodecanoic acid. In another embodiment, the carboxylic acid is a carboxylic acid that contains two or more carbons atoms. In one embodiment, the carboxylic acid is a fatty acid. One skilled in the art, with the benefit of this disclosure will recognize other appropriate carboxylic acids for use in this invention.

Embodiments of the sintering aid compositions may use the material useful for sintering, the amine, and the optional carboxylic acid in different molar ratios. In one embodiment, the molar ratio of amine to material useful for sintering may be from about 1:0.1 to about 0.1:1. In another embodiment, the amine to material useful for sintering is in a molar ratio of about 1:0.5. The ratio may be varied depending on the application. One skilled in the art, with the benefit of this disclosure will recognize appropriate molar ratios to use for embodiments of the present invention.

Embodiments of the present invention have sintering aid compositions that can be in different phases depending on the sintering application. For some applications, such as pressure casting, an aqueous solution phase of the sintering aid composition may be desirable. Other phases of the present invention may include having the sintering aid composition in a mixture, an emulsion, a dispersion, or combinations thereof. In an embodiment, the sintering aid composition is water-miscible phase, so it can be used in more automated processing (such as pressure casting), which has not been possible before. One skilled in the art, with the benefit of this disclosure will recognize other appropriate phases, or desired phases, for the present invention.

Embodiments of the present invention also disclose a method for sintering a ceramic article that includes the steps of providing an inorganic powder and a sintering aid composition, wherein the sintering aid composition comprises at least one material useful for sintering, at least one amine; and optionally at least one carboxylic acid. The inorganic powder may include any material suitable for firing. In an embodiment, the inorganic powder is SiC. The inorganic powder contacts the sintering aid composition to form a green body. A green body is a term used generally to describe an unfired (unsintered) ceramic item. In other embodiments, the green body may further include water, at least one binder, at least one deflocculant, and combinations thereof. One skilled in the art will recognize other appropriate additives that may be added in a green body. In other embodiments, a second material useful for sintering is contacted with the inorganic powder and sintering aid composition to form a green body.

In one embodiment, the green body is formed by pressing. In an embodiment, the green body is cast. In another embodiment, the green body is cast under pressure. One skilled in the art will recognize appropriate pressing and casting methods to use in embodiments of the present invention.

The method fires the green body to form a ceramic article. In this firing process the clay typically fuses to form the ceramic article. Firing may be done at different temperatures and pressures for different lengths of time. One skilled in the art, with the benefit of this disclosure will recognize appropriate firing techniques given the inorganic powder, green body and desired ceramic article.

EXAMPLES

Example 1

The following procedure was used to prepare laboratory quantities of the sintering aid composition. Into a 1000 milliliter (ml) glass beaker with magnetic stirrer and hot plate was placed 200.0 gram (g) (1.0 mole) tetraethylenepentamine (TEPA). The stirrer and heating were begun. While maintaining heating <110 degrees Celsius (° C.) (thermometer suspended in beaker) powdered boric acid 30.92 g, (0.50 mole) was added in aliquots. The resulting slightly viscous dark yellow/brown liquid was allowed to cool and then transferred to a bottle. The resulting mixture had a molar ratio of amine to boric acid of 1:0.5. Mixtures with other ratios of amine to boric acid were also made using the same procedure. Mixtures of amine, boric acid, and a carboxylic acid (neodecanoic acid) were also made. The sintering aid compositions are in Table 1. The molar ratios of TEPA, boric acid, and neodecanoic acid for the HX family are shown in Table 1. Although not shown, mixtures with fatty acids are also envisioned as a part of this invention.

TABLE 1

Compositions of Sintering Aid Compositions.

| Sample | Molar Ratios<br>TEPA:Boric Acid:Neodecanoic Acid |
|---|---|
| HX1 | 1:1:0 |
| HX2 | 1:1:0 |
| HX3 | 1:0.75:0 |
| HX4 | 1:0.5:0 |
| HX5 | 1:1:0.06 |
| HX6 | 1:1:0.29 |
| HX7 | 1:1:0.58 |

Example 2

In this example the sintering aid compositions (HX1-HX7) are used to prepare a ceramic. The SiC powder used was 0.7-2 micrometers (μm)μm from Compagnie de Saint-Gobain (Niagara Falls, N.Y.). The additives used were either a 5 μm, B4C boron carbide powder from UK Abrasives, Inc. (Chicago, Id.; or mixtures of tetraethylenepentamine (TEPA) and boric acid (HX1-HX4); or mixtures of tetraethylenepentamine, boric acid, and neodecanoic acid (HX5-HX7) developed by Huntsman Corporation (The Woodlands, Tex.). For the purpose of this study the percentages and type of HX additive was varied. In addition, a secondary addition of boron carbide was added to a specific batch.

SiC powders were initially dispersed in water to produce a 40 volume percent suspension. Into the suspension the boron carbide powders and/or the HX additive were added and mixed. The resultant batch was dried and pre-pressed to 250 psi (1.7 MPa). The formed green disks were densified by hot pressing. Dried disks were loaded in a graphite die. Using a Vacuum Industries, Inc. induction hot press, samples were heated at a rate of 25° C. per hour to 1500° C. under vacuum. The samples were held for one hour at 1500° C. This dwell was added to allow the carbon present from the additive to reduce the native $SiO_2$ layer present on the surface of the SiC powder. After one hour the samples were heated to 1800° C. where the hot press was then backfilled with argon and the sample pressed to 5.6 Ksi (38 MPa). The samples were then heated to temperatures varying from 2100° C. to 2300° C. for 15 minutes. The power was immediately turned off and the samples allowed to cool.

The resulting samples were sectioned and the density determined by Archimedes method. Hardness analyses were performed using a Knoop indentor at loads varying from 250 g to 2 Kg. Microstructural analyses was performed on fracture surfaces of sintered samples.

Results

Table 2 shows the effect the various HX sintering aid compositions had with increasing dose. In each case the hot pressing temperature was 2300° C. The highest achieved densities were with additives HX3-HX7. Samples using HX1 and HX2 did not result in hot pressed densities >3.0 g/cm³ and are omitted from Table 2. Samples using HX3 and HX4 allowed high densities to be achieved at lower dose requirements than samples using HX5, HX6 or HX7. Typically, >4.0% of the sintering aid compositions were required to achieve fully dense samples. In one case, for the sample using HX4, a super addition of B4C boron carbide powder was added along with the sintering aid composition. In that case, the total additive dose requirement to achieve full density was reduced from 4.5% to 3.5%. In the samples using HX5-HX7, significantly higher dosages of the sintering aid composition were required to achieve increased densities. In no recorded case were the samples using HX5-HX7 able to produce fully dense samples.

TABLE 2

Best achieved densities for the various sintering aid compositions.

| Sintering Aid Composition | Weight % Addition | Density |
|---|---|---|
| H3 | 3.0 | 3.19 |
| H3 | 3.5 | 3.18 |
| H3 | 4.0 | 3.15 |
| H3 | 4.5 | 3.21 |
| H4 | 2.0 | 2.91 |
| H4 | 2.5 | 3.08 |
| H4 | 4.0 | 3.02 |
| H4 | 4.5 | 3.21 |
| H4 | 3.5 H4, 0.5 B4C boron carbide powder | 3.20 |
| H5 | 3.5 | 2.91 |
| H5 | 6.0 | 3.12 |
| H6 | 3.5 | 2.76 |
| H6 | 6.0 | 3.14 |
| H7 | 6.0 | 3.18 |

Reduced hot press temperatures did reduce the final density. Table 3 shows the effect of reduced hot press temperature on density for the 3.5% H4/0.5% B4C boron carbide powder samples.

TABLE 3

Density vs. hot press hold temperature for HX4/B4C additive mixture.

| Hold Temp ° C. | Density (g/cm$^3$) |
|---|---|
| 2100 | 3.12 |
| 2150 | 3.16 |
| 2200 | 3.18 |
| 2300 | 3.21 |

The resultant microstructure of the best sample, 3.5% HX4/0.5% B4C boron carbide powder, was pore free and had an average grain size of 2 μm. This microstructure was compared to a commercially available SiC—N ceramic disk (CERCOM, Inc. of Vista, Calif.). The SiC—N material also has a pore free microstructure and an average grain size of approximately 5 μm. The finer grain structure in the HX sample may be attributed to a faster firing cycle that may have minimized grain growth.

The Knoop hardness versus load behavior of the highest density HX derived samples was compared with two commercial, hot-pressed ceramic disks: the SiC—N ceramic disk and the SiC—B ceramic disk (CERCOM, Inc. of Vista, Calif.). FIG. 1 shows the hardness versus load ranging from 250 g to 2 kilogram (kg). The two commercial samples exhibited similar hardness behavior. The HX5 and HX6 samples were lower in hardness compared with the commercial samples. This is not surprising as the densities of the HX5 and HX6 specimen were 3.12 and 3.14 g/cm$^3$ compared with 3.20 g/cm$^3$ for the commercial samples. Most interesting was the hardness behavior of the HX3 and HX4 samples. For the three samples, densities were equal to the commercial samples. However, the >1 Kg hardness values were 15-22% greater than either the commercial samples. While the exact reason for this improved hardness has yet to be established, one possible reason could be the finer grain structures produced with these additives. It appears that the additives provide a more efficient means of distributing boron and carbon into the unfired microstructure, thereby allowing for a rapid firing cycle that reduces rapid grain growth.

SUMMARY

A series of new boron and carbon (from amines and carboxylic acid) additives were derived and used as process/sintering aids in the densification of SiC. Examples indicate that the boron:carbon ratio may be an important factor in achieving densification. Two specific additives, HX3 and HX4, were found to produce fully dense SiC with addition level ranging between 3.5-4.5%. The microstructures were pore free and the average grain size was 2 μM. The specimen's derived from the HX additives exhibited a 15-22% increase in >1 Kg hardness over the commercial samples.

The sintering aid compositions of the present invention may also improve densification by dispersing the material useful for sintering in at an atomic level rather than at a particle level. The positively charged amine sites on the sintering aid compositions attach preferentially to the surface of the negatively charged inorganic powder (SiC) spheres, thereby placing the material useful for sintering at an atomic level between the SiC spheres. This creates process efficiencies by dispersing the material useful for sintering more evenly among the SiC spheres. Additionally, stronger ceramic articles result from reducing disruptions to the ordered arrays of the SiC spheres.

Although the present invention and its advantages have been described in detail, it should be understood that various changes, substitutions and alterations may be made herein without departing from the spirit and scope of the invention as defined by the appended claims.

What is claimed is:

1. A method for sintering a ceramic article comprising the steps of:
   a. providing an inorganic powder and a sintering aid composition, wherein the sintering aid composition comprises at least one material useful for sintering, at least one amine, and neodecanoic acid;
   b. contacting the inorganic powder and the sintering aid composition to form a green body; and
   c. firing the green body.

2. The method of claim 1 wherein the green body further comprises water, at least one binder, at least one deflocculant, or combinations thereof.

3. The method of claim 1 wherein the inorganic powder comprises SiC.

4. The method of claim 1 wherein the step of contacting the inorganic powder and a sintering aid composition to form a green body further comprises:
   a. providing a second material useful for sintering; and
   b. contacting the inorganic powder, the sintering aid composition, and the second material useful for sintering to form the green body.

5. A method for pressure casting a ceramic article comprising the steps of:
   a. providing an inorganic powder and a sintering aid composition, wherein the sintering aid composition comprises at least one material useful for sintering, at least one amine, and neodecanoic acid;
   b. contacting the inorganic powder and the sintering aid composition to form a green body;
   c. casting the green body under pressure; and
   d. firing the green body.

* * * * *